June 14, 1932. I. L. CHAMBERS 1,863,084
CUTTER BEARING STRUCTURE
Original Filed March 15, 1930
Fig. 1.
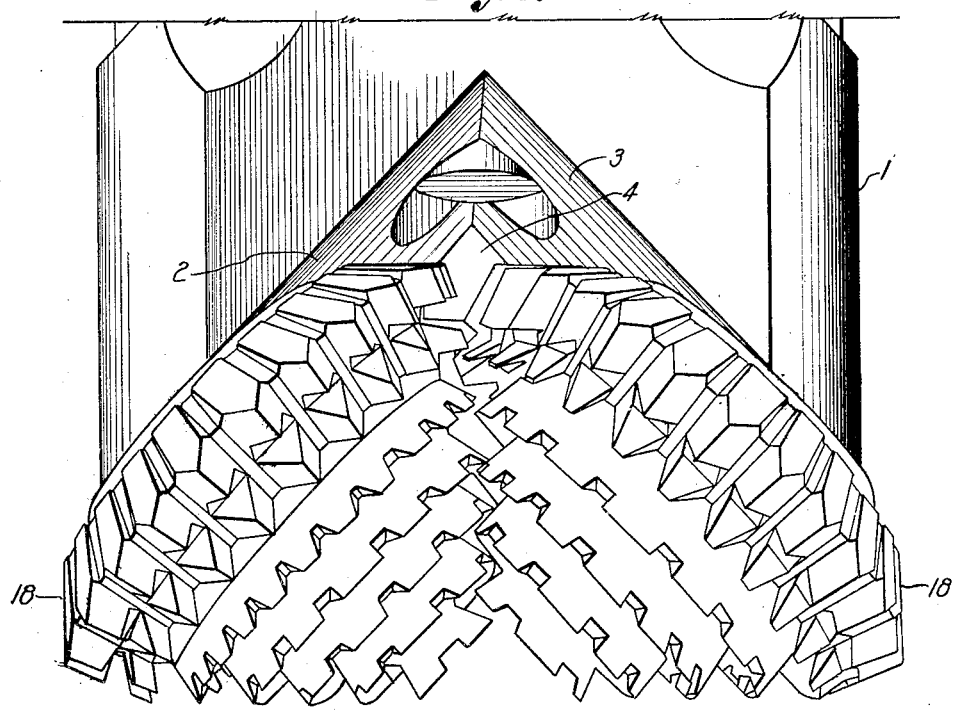
Fig. 3.
Fig. 2.
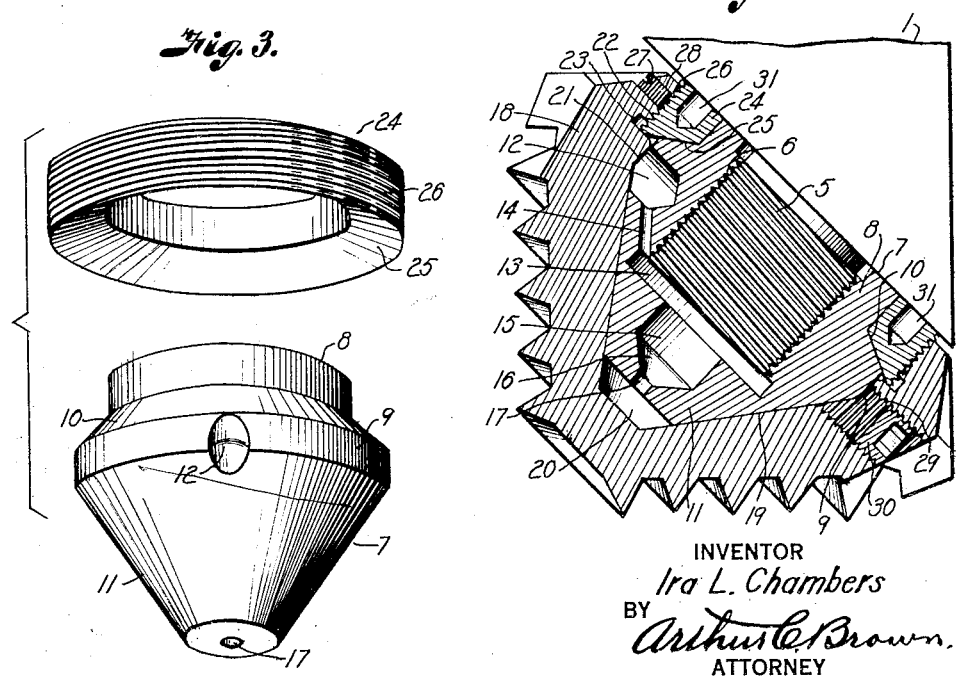
INVENTOR
Ira L. Chambers
BY Arthur C. Brown.
ATTORNEY Patented June 14, 1932

1,863,084

UNITED STATES PATENT OFFICE

IRA L. CHAMBERS, OF GARBER, OKLAHOMA, ASSIGNOR TO GARBER TOOL COMPANY, OF GARBER, OKLAHOMA, A CORPORATION OF OKLAHOMA; E. A. REED, TRUSTEE OF THE GARBER TOOL COMPANY, BANKRUPT

CUTTER BEARING STRUCTURE

Original application filed March 15, 1930, Serial No. 436,037. Divided and this application filed August 18, 1930. Serial No. 476,051.

My invention relates to bits for rotary well drilling apparatus and more particularly to a bearing structure for drill bit cones of this character adapted for rotation on the drill body, the present invention being a division of my co-pending application Serial Number 436,037, filed Mar. 15, 1930.

The principal object of my invention is to provide a bearing structure that embodies means for adequately lubricating the bit during its rotation on the drill stem.

A further object of the invention is to provide means for firmly securing a cone in rotatable relation with a drill bit.

In accomplishing these and other objects of my invention I have provided improved details of structure the preferred form of which is illustrated in the accompanying drawing, wherein:

Fig. 1 is a side elevation of the lower portion of a rotary drill bit including cones rotatably mounted on the body.

Fig. 2 is a vertical, central section through the bearing structure of a cone and adjacent portions of the cone mounting.

Fig. 3 is a perspective view of a locking ring and a bearing member or bushing in disassembled relation.

Referring more in detail to the drawing:

1 designates a bit body adapted to be supported in the usual manner on the lower end of a string of drill pipe and includes inner diverging plane faces 2 and 3 forming a socket 4. Secured to each of the faces 2 and 3 or formed integrally therewith is an externally threaded shank 5 for engaging the internally threaded socket 6 of a bearing member or bushing 7 including a reduced cylindrical neck portion 8, an annular flange 9 joined to said neck portion by an outwardly tapering wall 10, and an outer end of the bushing comprising a frusto conical portion 11.

A socket 12 adapted to serve as a chamber for lubricant is drilled into the flange 9 and is connected to a cylindrical chamber 13 at the lower end of the socket 6 by a port 14. An axial chamber 15 of less diameter than the chamber 13 communicates through a tapered port 16 with a further reduced port 17 opening through the outer end of the bushing.

A drill cone 18 for mounting on the bushing is provided with a conical recess 19 complementary to the conical end portion of the bushing, the recess in the cone being comparatively deep to reserve a space 20 for lubricant between the base of the recess and the end of the bearing member when the cone is mounted thereon. The outer end of the recess comprises a cylindrical wall 21 conforming to the outer end of the annular flange 9, and is further provided with a slightly enlarged and internally threaded opening 22 separated from the wall 21 by an annular groove 23.

A locking ring 24 having a downwardly tapered lower end wall 25 complementary to the outwardly tapered wall 10 of the bearing member, is externally threaded as indicated at 26 for engaging the threaded opening 22 of the cone, the groove 23 being adapted to receive foreign particles lodging in the threads and displaced therefrom as a result of threading of the cone on the locking ring.

Means for further preventing disengagement of the cone from the ring includes a set screw 27 threaded into a lateral opening 28 of the cone for seating on the external threads on the locking ring. The cone is further provided with a threaded opening 29 aligning with the socket 12 and serving as an inlet and as a supply chamber for lubricant fed into the bushing when the socket 12 registers with said threaded opening, a plug screw 30 being threaded in the opening 29 for closing the opening and for forcing lubricant into the chambers of the bushing.

In order to facilitate secure mounting of the locking ring and cone on the bearing member, sockets 31 are formed in the inner end wall of the ring for receiving a wrench or tool employed for threading the ring in the end of the cone.

Assuming a cone and bearing member to be constructed as described the procedure for assembling a cone on a bit body and the action of the lubricant to insure smooth operation would be as follows:

After a bushing is inserted in the conical socket of a cone the locking ring is mounted over the neck portion of the bushing and is threaded into the inner end of the cone until the bushing is firmly seated in the cone. A set screw is next threaded into its respective opening to engage the threads of the locking ring for preventing unthreading of the ring from the cone.

The assembled unit is then securely threaded on a shank 5, and lubricant is applied to the chambers of the bearing member by removing the plug screw 30 and rotating the cone until the threaded opening 29 registers with the socket 12 of the bushing.

Lubricant is forced into the socket 12 and through the ports 14 into the chambers 13, 15 and 20 until each of the chambers have been completely filled, whereupon the plug screw 30 is threaded into the filler opening to prevent escape of lubricant from the chambers.

Due to the pressure exerted on the lubricant in the filter opening by the plug screw, a small amount thereof is periodically fed into the socket 12 as the cone rotates on the bushing, insuring adequate lubrication of the bearing structure throughout a long period of service.

What I claim and desire to secure by Letters Patent is:

1. A device of the character described including a cone having a conical socket and a side port, a bearing member having a tapered portion adapted to rotatably engage the conical wall of said socket to form a chamber between the apex of the bearing member and the base of the socket, the bearing member having a channel adapted to connect said port with said chamber, and means for retaining the cone in rotative engagement with said bearing member.

2. A device of the character described including a cone having a conical socket and a side port, a bearing member having a tapered portion adapted to seat in said socket to form a chamber between the apex of the bearing member and the base of the socket, and having a channel and intermediate chambers adapted to connect said port with said first-named chamber, and means for retaining the cone in rotative engagement with said bearing member.

3. A device of the character described including a cone having a conical socket and a side port, a bearing member having a tapered portion adapted to seat in said socket to form a chamber between the apex of the bearing member and the base of the socket, and having a channel and intermediate chambers adapted to connect said port with the first-named chamber, said intermediate chambers decreasing successively, in diameter toward the apex of the bearing member, and means for retaining the cone in rotative engagement with said bearing member.

4. In a device of the character described in combination with a bit body having a threaded shank, a cone having a conical socket and a side port, a bearing member including a tapered portion adapted to seat in said socket and having a threaded axial opening for receiving said shank, said bearing member having a chamber adjacent the axial opening and a channel leading from the chamber to said port, and means for retaining the cone in rotative engagement with said bearing member.

5. In a device of the character described in combination with a bit body having a threaded shank, a cone having a conical socket and a side port, a bearing member including a tapered portion adapted to seat in said socket to form a chamber between the apex of the bearing member and the base of the socket, and having a threaded axial opening for receiving said shank, said bearing member having a channel and intermediate chambers adapted to connect said port with said first-named chamber, one of the intermediate chambers being formed at the base of said axial opening, and means for retaining the cone in rotative engagement with said bearing member.

In testimony whereof I affix my signature.

IRA L. CHAMBERS.